(12) United States Patent
Naumann et al.

(10) Patent No.: US 10,614,395 B2
(45) Date of Patent: Apr. 7, 2020

(54) SYSTEM AND METHOD FOR AUTONOMOUSLY PACKING PRODUCTS INTO CONTAINERS FOR DISTRIBUTION IN A SUPPLY CHAIN

(71) Applicant: Robert Bosch GmbH, Suttgart (DE)

(72) Inventors: Marc Naumann, Sunnyvale, CA (US); Goktug Cinar, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 745 days.

(21) Appl. No.: 15/135,939

(22) Filed: Apr. 22, 2016

(65) Prior Publication Data

US 2017/0206480 A1 Jul. 20, 2017

Related U.S. Application Data

(60) Provisional application No. 62/280,452, filed on Jan. 19, 2016.

(51) Int. Cl.
| | | |
|---|---|---|
| *G06Q 10/06* | (2012.01) | |
| *G06Q 10/04* | (2012.01) | |
| *G06Q 10/08* | (2012.01) | |

(52) U.S. Cl.
CPC ....... *G06Q 10/06315* (2013.01); *G06Q 10/04* (2013.01); *G06Q 10/06* (2013.01); *G06Q 10/083* (2013.01)

(58) Field of Classification Search
CPC ....... G06Q 10/08; G06Q 50/28; G06Q 10/083
See application file for complete search history.

(56) References Cited

U.S. PATENT DOCUMENTS 3,705,410 A * 12/1972 Kooy .................. G06Q 10/043
   705/7.12
4,554,625 A * 11/1985 Otten .................... B23D 15/06
   700/171

(Continued)

FOREIGN PATENT DOCUMENTS

WO   2000/068856 A2   11/2000

OTHER PUBLICATIONS

Eliiyi, Ugur et al., Applications of Bin Packing Models Through the Supply Chain International Journal of Business Management, vol. 1, No. 1, 2009 (Year: 2009).*

(Continued)

*Primary Examiner* — Scott L Jarrett (74) *Attorney, Agent, or Firm* — Maginot, Moore & Beck LLP (57) ABSTRACT

A system and method for managing a supply chain for distributing products integrates inventory control with packaging optimization. Historical demand data, cost and dimension data for products, containers, and shipping vessels is obtained, and a plurality of layout configurations for packing the products into the containers is determined. Based on the historical demand data and the cost and dimension data, an optimization model is used to determine (i) a layout configuration for the packing the products in the containers from amongst the plurality of layout configurations, and (ii) a shipment frequency for shipping containers packed according to the determined layout configuration. The optimization model is configured to minimize a cost of distributing products in the supply chain.

20 Claims, 5 Drawing Sheets

(56) References Cited

U.S. PATENT DOCUMENTS

| | | | | |
|---|---|---|---|---|
| 5,430,831 | A * | 7/1995 | Snellen | G06Q 10/043 700/217 |
| 5,501,571 | A | 3/1996 | Van Durrett et al. | |
| 5,936,863 | A * | 8/1999 | Kostelnik | G06Q 10/08 376/260 |
| 6,609,101 | B1 * | 8/2003 | Landvater | G06Q 10/06 705/7.25 |
| 6,721,762 | B1 * | 4/2004 | Levine | G06Q 10/04 |
| 6,876,958 | B1 * | 4/2005 | Chowdhury | G06Q 10/04 414/801 |
| 6,937,992 | B1 * | 8/2005 | Benda | G06Q 10/04 705/7.26 |
| 6,954,736 | B2 * | 10/2005 | Menninger | G06Q 10/06 705/28 |
| 7,043,320 | B1 * | 5/2006 | Roumeliotis | G05B 13/0265 700/100 |
| 7,085,687 | B2 * | 8/2006 | Eckenwiler | G05B 19/41885 703/1 |
| 7,426,484 | B2 | 9/2008 | Joyce et al. | |
| 7,480,623 | B1 * | 1/2009 | Landvater | G06Q 10/06315 705/7.25 |
| 7,979,359 | B1 * | 7/2011 | Young | G06Q 10/06 705/332 |
| 8,019,643 | B2 * | 9/2011 | Lore | G06Q 10/06375 705/14.1 |
| 8,086,344 | B1 * | 12/2011 | Mishra | G06Q 30/0283 700/214 |
| 8,275,583 | B2 * | 9/2012 | Devarajan | G06Q 10/04 703/1 |
| 8,326,679 | B1 * | 12/2012 | Rowe | G06Q 10/08 705/26.2 |
| 8,401,975 | B1 * | 3/2013 | Tian | G06Q 10/08 705/330 |
| 8,407,110 | B1 * | 3/2013 | Joseph | G06Q 10/087 705/26.1 |
| 8,452,671 | B2 * | 5/2013 | Zieger | G06Q 10/043 705/1.1 |
| 8,478,619 | B2 | 7/2013 | Benda et al. | |
| 8,560,461 | B1 * | 10/2013 | Tian | G06Q 10/087 705/332 |
| 8,868,230 | B2 * | 10/2014 | Tschanz | G05B 19/4097 700/217 |
| 8,918,750 | B1 * | 12/2014 | Moffitt | G06F 17/509 716/122 |
| 9,152,940 | B2 | 10/2015 | Nashif et al. | |
| 9,230,233 | B1 * | 1/2016 | Sundaresan | G06Q 10/0832 |
| 10,118,723 | B2 * | 11/2018 | Clark | B65B 57/00 |
| 2003/0050819 | A1 * | 3/2003 | Koenigbauer | G06Q 10/06314 705/7.24 |
| 2003/0110102 | A1 * | 6/2003 | Chien | G06Q 10/08 705/28 |
| 2003/0200111 | A1 * | 10/2003 | Damji | G06Q 10/08 705/335 |
| 2004/0158507 | A1 | 8/2004 | Meek et al. | |
| 2007/0282618 | A1 * | 12/2007 | Barahona | G06Q 10/04 705/338 |
| 2008/0046302 | A1 * | 2/2008 | Cartwright | G06Q 10/04 705/7.22 |
| 2012/0158385 | A1 * | 6/2012 | Arunapuram | G06Q 10/04 703/6 |
| 2012/0283868 | A1 * | 11/2012 | Rutt | G06Q 10/043 700/217 |
| 2012/0310793 | A1 | 12/2012 | Cheng et al. | |
| 2013/0218799 | A1 * | 8/2013 | Lehmann | G06Q 10/083 705/337 |
| 2014/0100769 | A1 * | 4/2014 | Wurman | G06Q 10/087 701/301 |
| 2014/0279659 | A1 * | 9/2014 | Seay | G06Q 10/083 705/337 |
| 2015/0019282 | A1 | 1/2015 | Kozak | |
| 2015/0161556 | A1 * | 6/2015 | Jena | G06Q 10/083 705/14.23 |
| 2016/0304299 | A1 * | 10/2016 | Daun | G06Q 10/08 |

OTHER PUBLICATIONS

Martins, Gustavo H., Packing in Two and Three Dimensions Naval Postgraduate School, Jun. 2003 (Year: 2003).*
Zhang, Ju-liang et al., Inventory control problem with freight cost and stochastic demand Operations Research Letters, vol. 37, 2009 (Year: 2009).*
Oracle Retail Advanced Inventory Planning—Order Management User Guide Release 15,0, Oracle, Dec. 2015 (Year: 2015).*
Oracle Shipping Execution—User Guide Release 11i, Oracle, Jul. 2000 (Year: 2000).*
Perboli, Guido et al., Packing problems in Transportation and Supply Chian: new problems and trends Procedia-Social and Behavioral Sciences, vol. 111, 2014 (Year: 2014).*
Ben-Kheder, Nejib et al., The Multi-Item Joint Replenishment Problem With Transportation and Container Effects Technical Report 89-29, Sep. 1992 (Year: 1992).*
Lodi, Andrea, Algorithms for Two-Dimensional Bin Packing and Assignment Problems Universita Degli Studi Di Bologna, 1999 (Year: 1999).*
International Search Report corresponding to PCT Application No. PCT/EP2017/050843 (4 pages).

* cited by examiner

SYSTEM AND METHOD FOR AUTONOMOUSLY PACKING PRODUCTS INTO CONTAINERS FOR DISTRIBUTION IN A SUPPLY CHAIN

RELATED APPLICATION

This application claims priority to U.S. Provisional Application No. 62/280,452, filed on Jan. 19, 2016, entitled "Packaging Size Optimization System," the disclosure of which is incorporated by reference herein in its entirety.

TECHNICAL FIELD

This disclosure relates generally to optimization systems and, more particularly, to supply chain management, inventory control logistics, and shipment packaging optimization systems.

BACKGROUND

A product supply chain generally includes a combination of manufacturers, secondary distributors, and customers, and is traditionally characterized by a manufacturer responding to demands (i.e., purchase orders) placed by their distributors, customers, or a combination thereof. However, a manufacturer responding purely to demand introduces inefficiencies into the distribution of products. Namely, fluctuations in demand result in purchase orders that either over or under estimate inventory requirements. This can result in both the shipment of unneeded products, and in failures to meet customer demand.

Efforts to alleviate these inefficiencies include optimizing purchase orders via an inventory control system. An inventory control system generally tracks average demand over time, and determines a size and frequency for purchase orders that maintains a constant average inventory that is robust to predicted fluctuations in demand.

Another issue in inventory control optimization is the issue of packing. Specifically, the capacity of delivery vehicles may not be perfectly matched to the quantity of units determined for a shipment via an inventory control system. In an example, an inventory control system determines that a distributor is to be shipped a shipment taking up 500 units of space. If a delivery vehicle has a capacity of less than 500 units, multiple vehicles are needed, and at least one will have some amount of un-utilized capacity. Similarly, if a delivery vehicle has a capacity of more than 500 units, the remaining capacity will also be un-utilized. This un-utilized space represents further inefficiencies, where a manufacturers and distributers are essentially paying to ship empty space.

Efforts have also been made to alleviate these further inefficiencies. In one example, if the capacity needed for a second shipment is less than the empty space in a vehicle, then the shipments can be grouped. However, this may not completely utilize all available empty space. For example, one shipment requires 300 units of space, and another requires 130. Together the shipments require 430 units. However, a delivery vehicle may have more or less than 430 units of capacity, and the un-utilized space, while diminished, is not eliminated. Additionally, if the shipments have different destinations, grouping the shipments together introduces further logistical problems involving packing the shipments so that they can be removed in the correct order efficiently, and the logistical difficulty of having a delivery vehicle making multiple stops.

A further inefficiency in many supply chains involves the packaging of products that are delivered to a distributor before being ultimately delivered to a customer. For example, when multiple orders are grouped together, the orders must be unpacked, separated, and repacked before being shipped to a final destination. The amount of unpacking and repacking necessary for distributing products to customers can significantly increase distribution costs, time, and labor. Efforts to alleviate these additional inefficiencies include organizing products within a group of orders in a way that facilitates unpacking. However, since the quantity of products in a shipment are determined in advance by an order or by an inventory control system, the amount of optimization that can be performed for the packaging of such preset shipments is limited.

What is needed, therefore, is a system and method for managing and optimizing a supply chain that is not limited by inventory control or by shipment packaging inefficiencies.

SUMMARY

A method for managing a supply chain integrates inventory control with packaging optimization. Shipments to secondary, e.g., local distributors are made via standardized storage boxes. Each storage box is configurable in one of a plurality of different layouts to hold different quantities of a product. The quantity of products packed into a storage box defines one logistical unit of products, and thus the packing layout selected for a product defines the quantity of products in the logistical unit. Secondary distributors are only sent orders in multiples of logistical units. The size of the logistical unit, and thus the packing layout, as well as a frequency of shipments to each secondary distributor are determined via an optimization between (i) costs of shipping the products, (ii) costs for inventory maintenance of the products, (iii) and costs for picking and packing the products. The optimization is also made with reference to physical dimensions of the products, physical dimensions of the plurality of layouts of the box, physical dimensions for shipping containers, physical dimensions of shipping vessels, demand over time for the products at the at least one secondary distributor, costs for distributing the products, and a quantity of products fitting into each of the plurality of packing layouts. Products are then shipped according to the selections.

In an embodiment, a method of managing a supply chain for distributing products includes obtaining historical demand data and cost and dimension data of the products, containers for shipping the products, and vessels from shipping the products and containers. A plurality of layout configurations for packing the products into the containers is determined. Based on the historical demand data and the cost and dimension data, an optimization model is used to determine (i) a layout configuration for the packing the products in the containers from amongst the plurality of layout configurations, and (ii) a shipment frequency for shipping containers packed according to the determined layout configuration. The optimization model is configured to minimize a cost of distributing the products in the supply chain. The products in the supply chain are distributed according to the determined layout configuration and shipment frequency.

In one embodiment, the historical demand data is determined via estimation.

In an embodiment, the optimization model includes a first constraint requiring that a demand for products at each destination within the supply chain is satisfied by distributing the products according to the determined layout configuration and shipping frequency.

In an embodiment, the optimization model includes a second constraint requiring that a total number of shipments to each destination in the supply chain per year is at least equal to a number of containers packed according to the determined layout configuration that collectively include a total number of products sufficient to meet a yearly demand of that destination.

In an embodiment, determining the plurality of layout configurations includes determining a plurality of product orientations for packing the products into each layout configuration, and for each layout configuration, selecting the product orientation enabling a maximum amount of the products to fit into the layout configuration.

In an embodiment, obtaining the historical demand data includes obtaining a plurality of weeks of weekly demand data, filtering the plurality of weeks of weekly demand data to only include data corresponding to products actively distributed by the supply chain, and destinations in the supply chain that redistribute received products to other destinations in the supply chain to produce filtered demand data, determining a historical total quantity of products demanded by each destination in the filtered demand data by adding together products distributed to that destination, and determining a historical shipping frequency for each destination by counting a number of product distributions to that destination over the plurality of weeks.

In an embodiment, the plurality of weeks of weekly demand data includes at least 8 weeks of weekly demand data. In another embodiment, the plurality of weeks of weekly demand data includes precisely 8 weeks of weekly demand data.

In an embodiment, the historical demand data includes obtaining a plurality of weeks of monthly demand data. In another embodiment, the historical demand data includes obtaining a plurality of weeks of yearly demand data.

In an embodiment, determining the layout configuration and shipment frequency using the optimization model is successively repeated over time to account for changes in the historical demand data over time.

In an embodiment, products are sub-grouped into trade units before being packed into the containers.

In an embodiment, the cost of distributing the products in the supply chain is defined by a sum of labor costs, e.g., picking and packaging costs Cp, inventory management costs Ci, and shipping costs Cs.

In an embodiment, the historical demand data, the cost and dimension data of the products, containers, and vessels, and the plurality of layout configurations define a plurality of parameters of the optimization model. The parameters include:

L—a the plurality of layouts configurations;
l—a particular layout from the set L;
P—a set of all products in the supply chain;
p—a particular product in the set P;
W—a set of destinations in the supply chain that redistribute received products to other destinations in the supply chain;
w—a particular destination from the set W;
$costLU_{l,p}$—a cost per container that includes inbound and outbound picking costs and assembly costs;
tus—a quantity of products;
$costTU_{l,p}$—a cost for packing each trade unit into a container; and
$lus_{l,p}$—a quantity of products in a container for a given product p and layout configuration l. A variable $y_w$ determined in the optimization model represents a number of containers shipped to destination w per year. The picking and packing costs Cp are defined by the equation:

$$Cp = \sum_{w \in W}\left(y_w \cdot costLU + \frac{y_w \cdot lus}{tus} \cdot costTU\right).$$

In an embodiment, the parameters further include:
$d_w$—a yearly demand of the destination w;
$price_p$—a price of product p; and
capitalcost—a multiplier for stock-keeping costs per year. A variable newfreq represents the shipping frequency determined in the optimization model. The inventory costs Ci are defined by the equation:

$$Ci = \sum_{w \in W} \frac{newfreq_w}{52} * d_{p,w} \cdot price_p \cdot 0.5 \cdot capitalcost + \sum_{w \in W} lus_p \cdot price_p \cdot 0.5 \cdot capitalcost.$$

In an embodiment, the parameters further include:
$costvol_w$—a cost per unit volume shipped to destination w; and
$LUvol_{l,p}$—a volume of a container packed with product p using layout configuration l.
The shipping costs Cs are defined by the equation:

$$Cs = \Sigma_{w\_W} = costvol_w \cdot y_w \cdot LUvol.$$

In an embodiment, the method further comprises determining that a trade unit or group of trade units is too large to fit into a container, and defining a further layout configuration as the trade unit or group of trade units not packed into the container.

In an embodiment, the method further comprises determining that a trade unit or group of trade units is smaller than a smallest volume defined by the plurality of layout configurations by a predetermined factor, and limiting a quantity of trade units or groups of trade units that can be packed into a container to a quantity of trade units or groups of trade units fitting into the smallest volume.

In an embodiment, the method further comprises determining an amount of air space remaining in a container packed according to each layout configuration, the amount of airspace indicative of a packing efficiency of the layout configuration.

In an embodiment, the optimization model is further configured to optimize between minimizing the cost of distributing products and maximizing the packing efficiency.

In an embodiment, the optimization model is further configured to group together different products in demand at a common destination into common containers.

In an embodiment, a computing device for managing distribution in a supply chain includes a processor and a plurality of components executed by the processor. The components include a historical data component, a preprocessing component, an optimization model, and an output component. The historical data component is configured to obtain (i) historical demand data of products in the supply chain, and (ii) cost and dimension data of the products and of vessels and containers for shipping the products such as packages, pallets, boxes, trucks, ships, cargo containers, etc. The pre-processing component is configured to determine a plurality of layout configurations for packing the products into the containers. The optimization model is configured to use the historical demand data and the cost and dimension data to determine (i) a layout configuration for the packing the products in the containers from amongst the plurality of layout configurations, and (ii) a shipment frequency for shipping containers packed according to the determined layout configuration that minimizes a cost of distributing products in the supply chain. The output component is configured to output the layout configuration and shipment frequency determined by the optimization component.

In an embodiment, the output component is further configured to operate the supply chain according to the layout configuration and shipment frequency determined by the optimization component.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
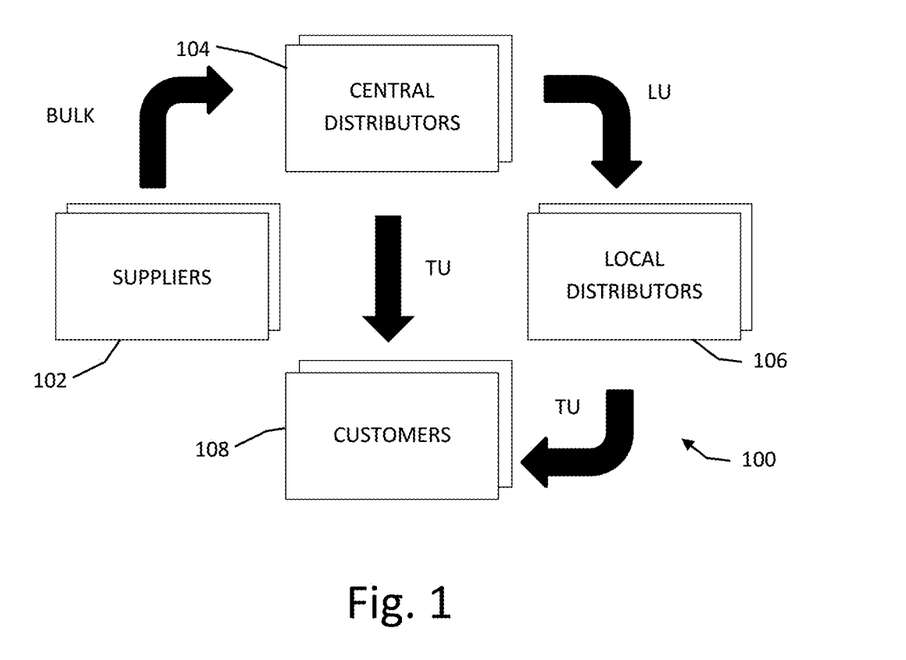
FIG. 1 is a functional block diagram of a supply chain according to this disclosure.

FIG. 1 illustrates a functional block diagram of a supply chain system 100 according to this disclosure. The system 100 includes suppliers 102, central distributors 104, local distributors 106, and customers 108. While supply chain system 100 includes a plurality of suppliers 102, central distributors 104, local distributors 106, and customers 108, in other embodiments, a supply chain system includes only one of one or more of suppliers, central distributors, local distributors, and customers. Additionally, in this embodiment, the supply chain system 100 manages the distribution of a plurality of products, but in other embodiments, a supply chain system manages the distribution of a single product.

A supplier 102 converts source materials into finished products. Finished products are assembled into trade units (hereinafter "TU"). A TU represents a fine distribution of products, and are packaged in a condition to be received by customers 108 which include, for example, end users, public-facing retail spaces and FOB delivery services. TU are then assembled into logistic units (hereinafter "LU"). An LU represents a rough distribution of products grouped into TUs. LUs are then grouped together, e.g., in pallets, trucks, shipping containers, or the like for bulk shipment to central distributors 104. In this embodiment, different suppliers 102 distribute different products. In another embodiment, at least one supplier distributes multiple products. In a further embodiment, more than one supplier distributes the same product.

A central distributor 104 unpacks the LUs from the bulk shipments from a supplier 102. A portion of the LUs are forwarded on to local distributors 106. TUs are unpacked from another portion of the LUs, and are forwarded on to customers 108.

A local distributor unpacks TUs from the LUs, and forwards TUs on to additional customers 108. The local distributors 106 include, for example, a secondary distribution warehouse, a shipment routing facility, a wholesaler, an order fulfillment center, or the like.

Each central distributor 104, local distributor 106, and customer 108 has a demand for products to be met by shipments through the supply chain. The demand for each local distributor 106 is defined by the sum of the demand of all customers 108 served by that local distributor. The demand for each central distributor 104 is defined by the sum of all local distributors 106 served by that central distributor 104 and the sum of all customers 108 directly served by that central distributor 104. In some embodiments, a local distributor 106 is served by more than one central distributor 104, and thus the demand of that local distributor 106 is portioned between each of the central distributors 104 serving the local distributor 104.

Figure 2:
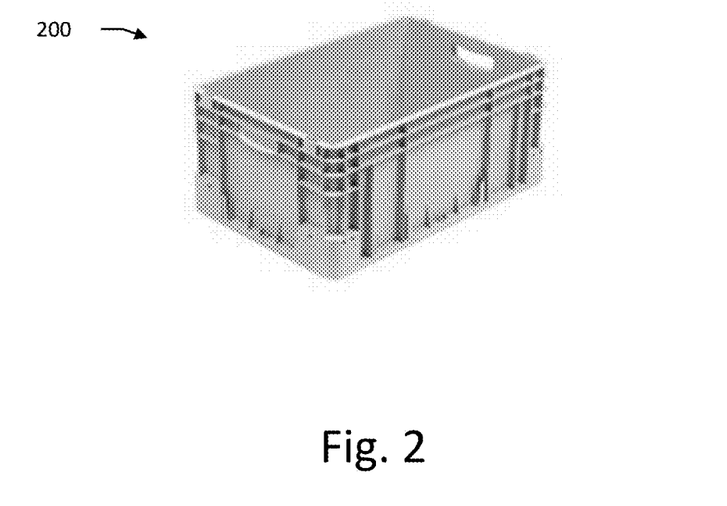
FIG. 2 is a perspective image of an exemplary storage box according to this disclosure.

One technique that facilitates supply chain optimization includes utilizing standardized modular shipping containers for LU shipments. FIG. 2 is a perspective image of an exemplary product storage box 200 usable to transport different products between suppliers 102, central distributors 104, local distributors 106, and customers 108. The storage box 200 is modular, in that a variety of sub-dividers can be inserted into the interior of the storage box to form differently sized compartments. In other embodiments, standardized pallets, or other acceptable containers can be used instead of or in addition to the storage boxes 200. Utilizing standardized containers for LU shipments, simplifies the operation of the central distributors 104, since individual LUs are forwarded on to local distributors 106 without unpacking and repacking the TUs or products within.

Figure 3:
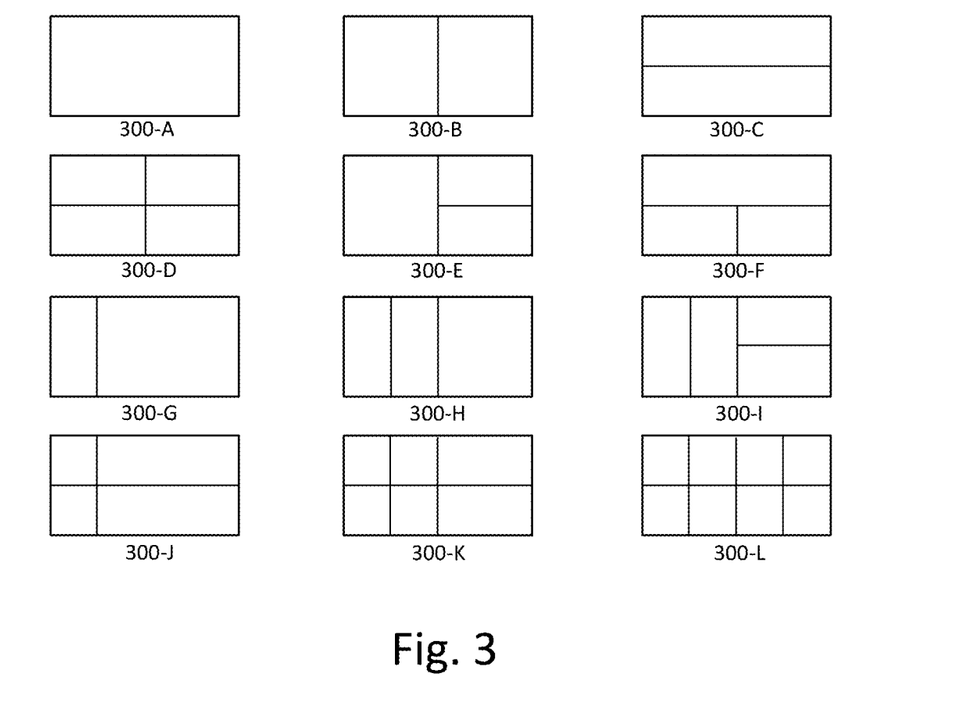
FIG. 3 is a top view of exemplary embodiments of different layout schematics for the storage box of FIG. 2.

FIG. 3 illustrates top-view schematics for a variety of different sub-divisions 300 A-L of the storage box 200, but other subdivisions are also contemplated. For instance, while the sub-divisions 300 A-L in the schematics illustrated in FIG. 3 are substantially rectangular, in other embodiments, sub-divisions can be of other shapes, such as triangles, irregular shapes, or shapes configured to fit around a particular product or TU. Different sub-divisions can be used to store different products, or multiple sub-divisions can be used to efficiently group TUs of the same product. For example, sub-divisions can be sized so as to efficiently pack TUs, so as to group TUs being shipped to different destinations, or for any other acceptable reason. In one embodiment, the storage container 200 is subdivided vertically.

Optimizing the supply chain 100 using modular storage boxes includes determining an optimal layout for a container, an optimal quantity of products to fill the different subdivisions of that layout, and an optimal shipment schedule that satisfies the demand in the supply chain 100. Hereinafter, the quantity of products filling a particular layout of a container is defined as the LU of that product given the particular layout. According to this disclosure, the layout, quantity of products in a shipment, and shipment frequency are treated as interrelated variables, and the supply chain 100 is managed by using an optimization system 400 illustrated in FIG. 4.

Figure 4:
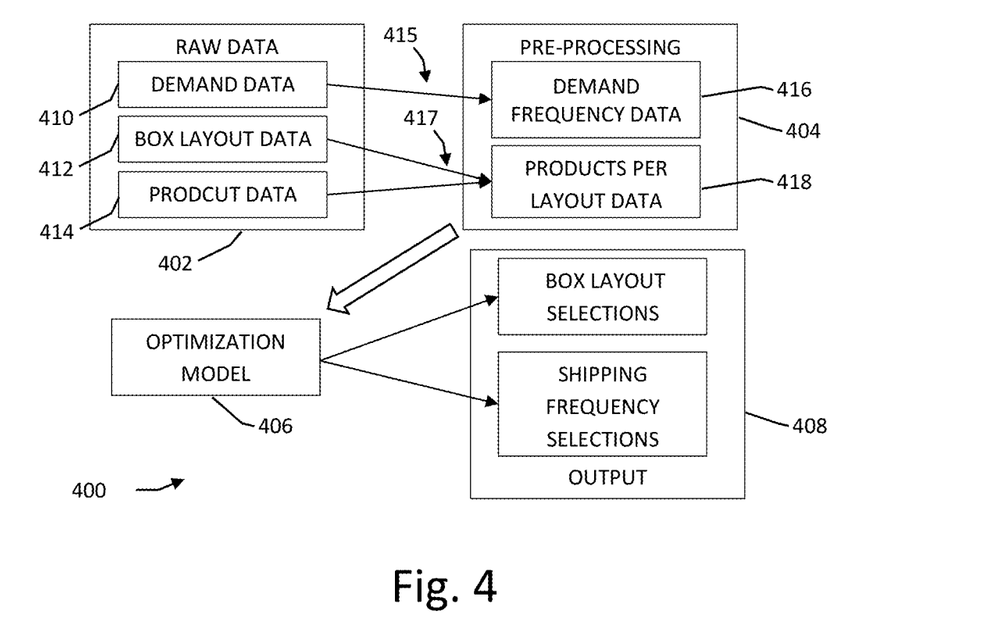
FIG. 4 is a flow diagram for a supply chain management system according to this disclosure that includes data pre-processing and an optimization model.

The system 400 includes a raw data entry block 402, a pre-processing block 404, an optimization model block 406, and an output block 408.

The raw data block 402 represents historical information about the supply chain 100. The historical information in the raw data block 402 includes demand data 410, box layout data 412, and product data 414.

In this embodiment, the demand data 410 includes a history of weekly demand data for each central distributor 104, local distributor 106, and customer 108 in the supply chain 100 (FIG. 1). Preferably, the demand data 410 includes at least two months' worth of data for each distributor 104, local distributor 106, and customer 108 in the supply chain 100. The weekly demand data includes, for example, for each distributor 104, local distributor 106, and customer 108, (i) a listing of each different product in demand, (ii) a listing of where each product originated, (iii) a listing of each product's destination, (iv) a listing of a quantity of each product delivered to each destination, and time/date data for each delivery to each destination.

In other embodiments, the demand data 410 includes historical demand data for other time intervals. For example, the demand data can include monthly demand data, yearly demand data, etc. In one embodiment, the demand data 410 includes a running average of demand taken each day, month, year, etc. For example, each week, demand data is averaged for the preceding four weeks, 52 weeks, quarter, etc. In one embodiment, the demand data is estimated, for example, with reference to sales projections, market data, or other factors.

The box layout data 412 includes data describing the possible sub-division layouts for the modular storage boxes, and data describing the three-dimensional size of the storage boxes and any associated packaging material.

The product data 414 includes, for example, a listing for each product of (i) price per product, (ii) weight, (iii) TU volume size, (iv) previous LU volume size, if available, (v) product stock-keeping costs (vi) picking costs, i.e., costs associated with selecting products for a shipment, and (vii) packing costs, i.e., costs associated with packaging selected products into TU for shipment.

The pre-processing block 404 preprocesses the historical information to define optimization parameters for the optimization model 406. Specifically, in preprocess 415 the preprocessing block 404 assembles the demand data 410 into demand frequency data 416, as discussed in more detail below. Additionally, in preprocess 417 the preprocessing block 404 uses the box layout data 412 and product data 414 to determine products per layout data 418, as discussed in more detail below. The preprocessing block 404 then feeds the demand data 410, demand frequency data 416, and products per layout data 418, along with the product data 414, as optimization parameters to the optimization model 406.

The optimization model 406 performs an optimization using the parameters, and outputs results to the output block 408, as described in more detail below.

Figure 5:
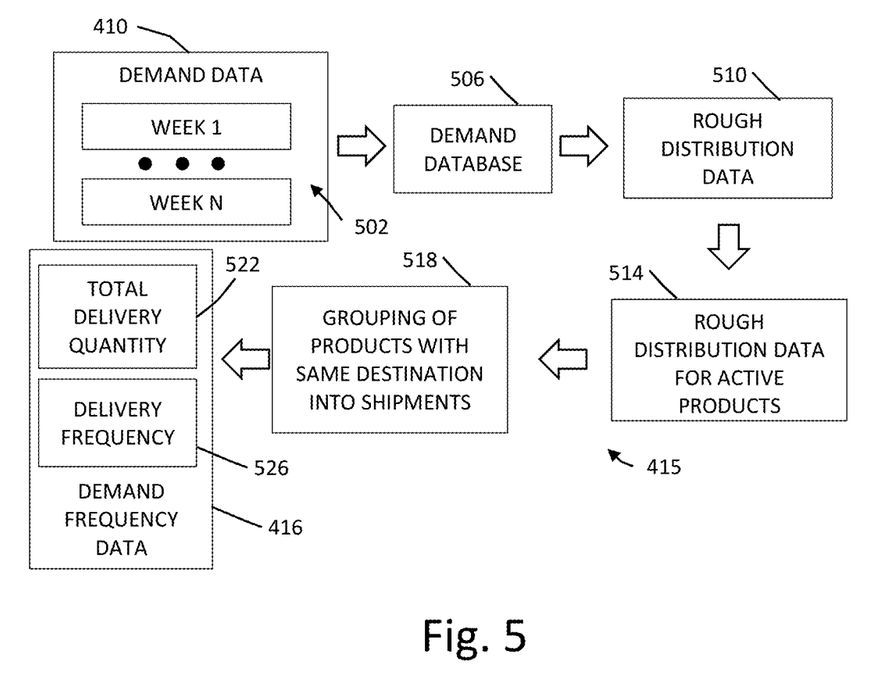
FIG. 5 is a flow diagram for the data preprocessing in FIG. 4.

FIG. 5 illustrates the preprocess 415 of FIG. 4 in more detail. The demand data 410, which in this embodiment includes a weekly demand data 502 for each of weeks 1 through N, is assembled into a demand database 506. The fine distribution of TUs being shipped from central distributors 104 directly to customers 108, and from local distributors 104 to customers 108 is filtered out of the demand database 506 to produce rough distribution data 510. Inactive products, such as products that have been discontinued, are off-season, or are otherwise unavailable, are filtered out from the rough distribution data 510 to produce rough distribution data for active products (block 514). The rough distribution data for active products (block 514) is grouped together to identify deliveries of products to a common destinations (block 518). A sum of the quantities of products to each common destination defines a historical total delivery quantity 522 for each destination, and a count of deliveries to each destination defines a historical delivery frequency 526 for each destination. The total delivery quantity 522 and delivery frequency 526 together define the demand frequency data 416.

An example of pre-processed demand frequency data 416 is shown in Table 1, below.

TABLE 1

| Shipping Origin | Shipping Destination | Products | Total Delivery Quantity in two months | |
|---|---|---|---|---|
| CSO | Ship-to Party | Material No. | Quantity | Frequency |
| 60 | 112524 | 1618630203 | 6 | 1 |
| 60 | 112524 | 1619999006 | 36 | 1 |
| 60 | 1109504 | 2608596050 | 1200 | 1 |
| 60 | 1109506 | 2608596050 | 4800 | 4 |
| 60 | 1163099 | 2608000352 | 160 | 8 |
| ... | ... | ... | ... | ... |

In table 1, the columns represent, from left to right, a shipping origin for an order by origin code, a shipping destination for the order by destination code, a product in the order by model number, a quantity of the product in the order, and a frequency at which deliveries of the product are made from the origin to the destination within a particular time period, which is two months in this embodiment. Each row of data corresponds to an origin-destination-product triple. In other words, multiple deliveries of the same product from the same origin to the same destination are grouped together in a single row. Different products shipped to the same destination (rows 3 and 4) are listed separately, and so too are the same product shipped to different destinations (rows 5 and 6) listed separately. While only a single origin "60" is illustrated in Table 1 for the purpose of clarify, in other embodiments, the demand frequency data 416 includes data for multiple origins in the supply chain 100.

Figure 6:
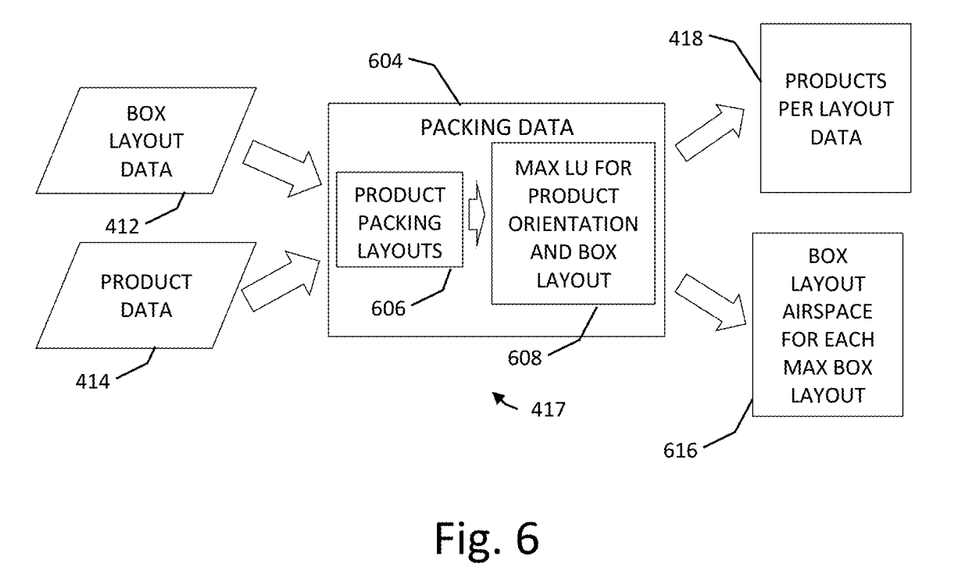
FIG. 6 is another flow diagram for the data preprocessing in FIG. 4.

FIG. 6 illustrates the preprocess 417 of FIG. 4 in more detail. Box layout data 412 and product data 414 are used to determine packaging data 604. Products can be packed together in a variety of orientations. The containers for LUs can also be subdivided into a variety of layouts with different subdivisions, such as the layouts 300 A-L illustrated in FIG. 3. Given a product of certain dimensions, a different quantity of the products will fit into a subdivision depending of the orientation of the product, which is described by the packing data 604

An example of packaging data is listed below in Table 3.

TABLE 2

| Product | Layout | Subdivision | Orientation | Total Quantity Fit |
|---|---|---|---|---|
| ... | ... | ... | ... | ... |
| 1600499005 | Layout1 | 1 | 1 | 65 |
| 1600499005 | Layout1 | 1 | 2 | 80 |
| ... | ... | ... | ... | ... |
| 1600499005 | Layout1 | 2 | 1 | 76 |
| ... | ... | ... | ... | ... |
| 1600499005 | Layout2 | 1 | 1 | 32 |
| ... | ... | ... | ... | ... |
| 1600793007 | Layout1 | 1 | 1 | 21 |
| ... | ... | ... | ... | ... |

In table 2, the columns represent, from left to right, products by model number, a particular layout from amongst the plurality of possible layouts for the container, a particular subdivision within the layout, a particular orientation of the product for packing, and a quantity of the product that fit into that subdivision of that layout given the orientation of the product. Each row thus represents a different product packing layout 606, and the total quantity fit column on the far right represents the maximum LU quantity (block 608) for a given product based on the layout, subdivision, and product orientation.

For example, as shown in table 2 above, in layout 1, 65 of product 1600499005 fit into subdivision 1 of the layout, while 80 fit into subdivision 2. As many as six or more different orientations of a product can be used to determine different potential fits of products into different subdivisions of the different layouts. Given a product, for each layout, there exists an optimal orientation that results in a maximum of the product fitting into the layout. These maximums are collected to determine the optimal orientations of products in each layout/subdivision, and to assemble the products per layout data 418.

An example of products per layout data 418 is shown in Table 3.

TABLE 3

| Material No. | Layout 1 | Layout 2 | Layout 3 | ... | Layout M |
|---|---|---|---|---|---|
| 1600499005 | 80 | 30 | 20 | ... | 0 |
| 1600793007 | 30 | 10 | 5 | ... | 0 |
| 2608570135 | 1270 | 480 | 270 | ... | 10 |
| 1602025024 | 70 | 20 | 15 | ... | 0 |
| 1602319003 | 740 | 300 | 0 | ... | 0 |
| ... | ... | ... | ... | ... | ... |

In table 3, each row corresponds to a different product to be packed into a container. The left-most column identifies the product by model number, and each of the columns to the right identifies a maximum number of the product that fit into the corresponding layout of the container due to the optimal orientation of the product. For example, in table 2, the maximum number of product 1600499005 that could fit into Layout1 is 80, occurring for the second possible orientation. Thus table 3 lists the maximum quantity for Layout1 of product 1600499005 as 80. As the maximum quantity of a product fitting into a particular layout, the quantities in FIG. 3 thus represent the quantity of products in an LU if that layout is selected for that product. The products per layout data 418 thus represents a collection of different possible product packaging configurations for shipping containers, which are presented as options for the optimization model.

In this embodiment, the preprocess 417 also includes calculating an amount of airspace remaining in a box due to each packing configuration (block 616). In an embodiment, the airspace quantity is incorporated into the optimization mode, and is used, for example, as an efficiency metric, or when grouping products together into a common shipment.

Figure 7:
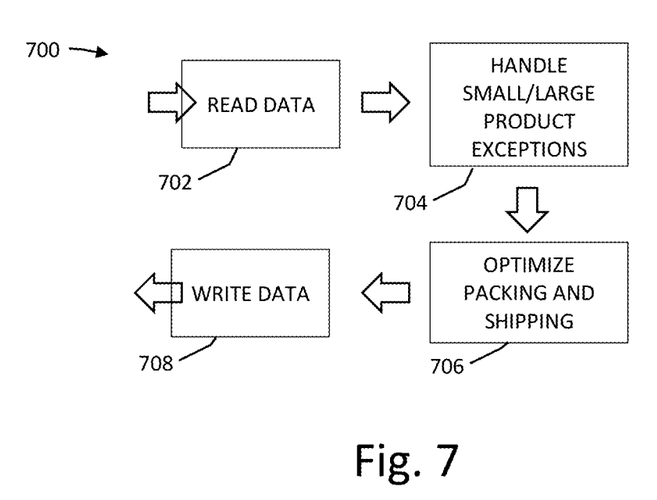
FIG. 7 is a further flow diagram for the optimization model of FIG. 4.

FIG. 7 illustrates the optimization model 406 from FIG. 4 in more detail. The demand frequency data 416 and products per layout data 418 is fed into the optimization model 406 at 702. At 704, small and large product exceptions in the products per layout data 418 are addressed. At 706, the optimization model 406 uses the demand frequency data 416 and products per layout data 418 to optimize the packing and shipping of all products in the supply chain 100, and at 708, results of the optimization, including box layout selections and shipping frequency selections are read out of the optimization model 406 to form the output block 408 in FIG. 4.

The handling of small and large product exceptions in the products per layout data 418 at 704 addresses situations where products are too large to fit within the physical dimensions of a box, and situations where products or TUs of products are so small that an excessive number of products or TUs fit into a single layout. For example, packing 10,000 separate matchbook-sized TUs of a product in a storage box may result in picking and repackaging that is not efficient in terms of cost, labor, or time.

In this embodiment, over-packing of small products is mitigated by limiting the number of TUs of such small products that can form an LU to the number of TUs that fit within box layout sub-division having the smallest capacity. Conversely, oversized products are addresses by adding the product, a TU, or a grouping of TUs as additional possible packaging layouts. In other words, when a product or TU is too large to fit within a storage box, the product, TU, or group of TUs are shipped without a storage box, and are used instead of a storage box to signify a shipping container in the model.

In performing the optimization of packing and shipping at 706, the optimization model 406 uses parameters based on the information read into the optimization model 406 at 702. The parameters used by the optimization model include:

L—the set of all possible box layouts;
l—a particular layout from the set L;
P—the set of all products in the supply chain;
p—a particular product in the set P;
W—the set of possible destinations for an LU in the supply chain;
w—a particular destination from the set W;
$d_w$—a yearly demand of the destination w;
$costLU_{l,p}$—a cost per LU, combining inbound and outbound picking costs and assembly costs;
$costTU_{l,p}$—a cost for assembling an LU per TU;
tus—a quantity of products in a TU;
$lus_{l,p}$—a quantity of products in an LU for a given product and layout;
$price_p$—the price of product p;
capitalcost—a multiplier for stock-keeping costs per year, generally 0.09;
$costvol_w$—a cost per unit volume shipped to destination w; and
$LUvol_{l,p}$—a volume of an LU, including air space, for a given product and layout.

In addition to selecting amongst the different possible layouts L which affects, for example, the values of lus, LUvol, costTU and costLU, the optimization model is also configured to adjust other variables, including:

newfreq$_{w,p}$—a number of weeks between shipments to the destination w; and y$_{w,p}$—the number of LUs sent to a destination w per year;

In this embodiment, the equations below are iteratively applied to each product p in the set P. Furthermore, the selection of a layout l from the set L is also performed iteratively. Therefore, for the purpose of clarity, the subscripts l and p are not shown in the equations below.

The optimization model 406 additionally applies constraints to the parameters and variables. A first constraint is configured to ensure that the demand of each of the destinations W in the supply chain is satisfied. This constraint is achieved by requiring that, for each destination w in the set W:

$$y_w \cdot lus \geq d_w$$

In other words, the total quantity of products shipped per year must be at least the total quantity of products A second constraint is configured to ensure shipments to a destination w do not require subdividing an LU. In other words, this constraint requires that number of shipments to a destination w per year is at least equal to the number of LUs that, in sum, contain a quantity of products sufficient to meet the demand of the destination w. This constraint is achieved by requiring that, for each destination:

$$\frac{newfreq_w}{52} \geq \frac{lus}{d_w}$$

Based on the parameters and constraints, the optimization model is configured to optimize the selection of the box layout and the other variables of all of the products in the supply chain for cost. The total cost for distributing a product in a supply chain is a sum of labor costs that include, for example, picking and packing costs Cp, inventory maintenance costs Ci, and shipping costs Cs.

Picking and packing costs Cp for each destination w in the set W are expressed by:

$$Cp = \sum_{w \in W} \left( y_w \cdot costLU + \frac{y_w \cdot lus}{tus} \cdot costTU \right)$$

Inventory costs Ci are expressed by:

$$Ci = \sum_{w \in W} \frac{newfreq_w}{52} * d_{p,w} \cdot price_p \cdot 0.5 \cdot capitalcost + \sum_{w \in W} lus_p \cdot price_p \cdot 0.5 \cdot capitalcost$$

And shipping costs are expressed by:

$$Cs = \sum_{w \in W} costvol_w \cdot y_w \cdot LUvol$$

Thus, optimizing for cost includes selecting box layouts (l), shipment frequencies to each destination (newfreq$_w$), and the number of LU's set to each destination per year (y$_w$) that results in a minimum total distribution cost, expressed by:

$$\min \sum_{w \in W} P + I + S$$

In this embodiment, the optimization model 406 uses a mixed-integer linear programming solver, but any acceptable type of model solver could be used.

Once the packing and shipping of the products in the supply chain has been optimized, the results read out of the optimization model 406 at 708 are used to manage the supply chain.

In one embodiment, the optimization model 406 is run successively over time. Demand generally varies over time. Additionally, suppliers, central distributors, local distributors, and customers may be added to or removed from the supply chain for various reasons. By running the optimization model 406 successively over time, changes in demand and in the structure of the supply chain are monitored and adapted to.

In another embodiment, the optimization system 400 of FIG. 4 is integrated into an automated packing system. Once optimized LU sizes and layouts of products are determined by the optimization system 400, the automated packing system at least substantially autonomously picks and packs products into storage boxes according to the optimized LU sizes and layouts.

In a further embodiment, the optimization system 400 is further configured to associate or prioritize the association of products, LUs, or assembled shipments that are regularly shipped together. Such association is also usable as a further factor to be optimized in addition to distribution cost, LU size, and shipping frequency.

As discussed above, benefits of an optimization system according to this disclosure include improved inventory maintenance costs as well as a system that is adaptive to demand. These and other benefits are illustrated in the following examples.

Example 1

A Conventional Supply Chain

In a conventional supply chain, a local distributor has an average weekly demand of 30 units. The local distributor places an order for the exact amount of the demand, i.e., 30 units. Over the course of a week, the average inventory is 30×0.5=15 units. On average, the full demand is met by the end of each week, and the local distributor must make a new order each week in order to replenish its inventory. Additionally, the local distributor has a decreased ability to satisfy variations in demand toward the end of each week, as the inventory stock will be mostly depleted until the next order arrives.

Example 2

A Supply Chain with Order Sizes Set to Multiples of an LU According to this Disclosure In a supply chain according to this disclosure, a local distributor also has an average weekly demand of 30 units. For the supply chain, the optimization model determines that a shipment LU of 40 units minimizes total shipping+inventory costs. Thus, orders for the local distributor are in multiples of 40 units. In a first week, the distributor has a surplus of 10 units, 40 minus the 30 from demand. In a second and third week, this continues, with the distributor having surplus of 20 units and 30 units respectively. In a fourth week, the local distributor does not make an order, and instead uses the accumulated surplus from previous weeks. Although inventory costs may be higher due to carrying the surplus inventory, the costs per shipment are reduced due to the optimization model, and the local distributor only needs to make orders 3 out of every 4 weeks, saving the cost of one shipment per month on average. Additionally, because the local distributor is maintaining a surplus stock of units, the local distributor is better equipped to respond to fluctuations in demand.

Example 3

A Supply Chain with a Different Demands at Different Destinations According to this Disclosure In a supply chain according to this disclosure, a supply chain has a demand that varies across three different local distributors. In a first local distributor, the weekly demand is 10 units. In a second local distributor, the demand is 60 units. In a third local distributor, the demand is 35 units. For the supply chain, the optimization model determines that a shipment LU of 20 units minimizes total shipping+inventory costs. Thus, orders to each distributor are in multiples of 20 units. The optimization model sets a shipping frequency for the first local distributor as one order with 1 LU every 2 weeks, for the second local distributor as 1 order with 3 LU every week, and for the third local distributor as one order every week that is 2 LU is stock is less than 15 units and otherwise 1 LU.

Figure 8:
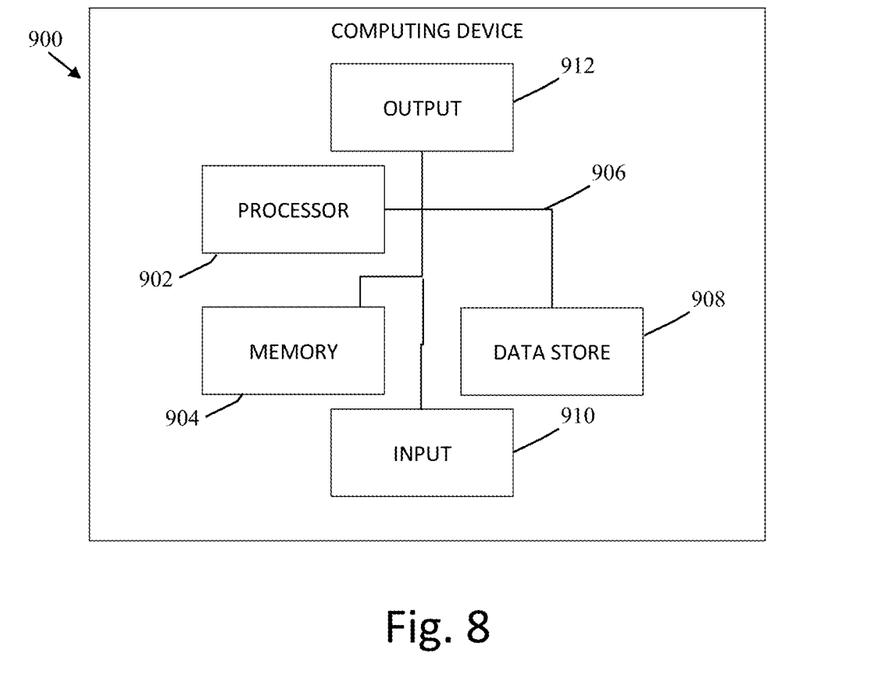
FIG. 8 is a functional block diagram of an exemplary computing device for operating a supply chain management system according to this disclosure.

In an embodiment, a supply chain management system according to this disclosure is implemented, at least in part, as computer-readable instructions executed by the processor of a computing device. FIG. 8 illustrates an exemplary computing device 900 that is usable in accordance with the system and methods according to this disclosure. For instance, the computing device may be used to manage a supply chain in performing such tasks as entering raw data, preprocessing the raw data, running an optimization model using the pre-processed data, and determining outputs for managing the supply chain. In another example, the computing device 800 is integrated with automated warehouse mechanism such as an automated picking, packing, or repackaging machine.

The computing device 900 includes at least one processor 902 that executes instructions stored in a memory 904. The instructions may be, for example, instructions for implementing one or more of the functional blocks or method operations discussed above. The processor 902 accesses the memory 904 by way of a system bus 906. In addition to storing executable instructions, the memory 904 may also store other information, such as information regarding demand in the supply chain, product data, storage box data, or the like. Such information may also be stored within the data store 908 that is also accessible to the processor 902 by way of the system bus 506. The computing device 900 also includes an input interface 810 that allows external device to communicate with the computing device 900. For instance, the input interface 510 may be used to receive instructions a user. The computing device 900 also includes an output interface 812 that outputs information from the processor 902, such as by displaying text, images, or other outputs.

Computer-readable media such as the memory 904 and data store 908 includes any available storage media that is accessible by a computer. By way of example, and not limitation, such computer-readable storage media includes RAM, ROM, EEPROM, CD-ROM or other optical disk storage, magnetic disk storage or other magnetic storage devices, or any other medium that is usable to carry or store desired program code in the form of instructions or data structures and that can be accessed by a computer. Further, a propagated signal is not included within the scope of computer-readable storage media. Alternatively, or in addition, the functionally described herein are performed, at least in part, by one or more hardware logic components.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A method for autonomously packing products into containers for distribution in a supply chain, the method comprising:

receiving, and storing in a memory, (i) historical demand data indicating previous demand of a plurality of products by a plurality of destinations in the supply chain over a period of time, (ii) product data indicating costs and dimensions of the plurality of products, and (iii) container layout data indicating dimensions of containers used to pack the products and a plurality of possible layout configurations for packing the products in the containers, each possible layout configuration including at least one sub-division of the containers;

determining, with a processor, for each destination in the plurality of destinations, (i) a historical total quantity for each product in the plurality of products demanded by the respective destination and (ii) a historical shipping frequency for each product in the plurality of products to the respective destination, based on the historical demand data;

determining, with the processor, for each product in the plurality of products, a maximum amount of the respective product to fit in each sub-division of each possible layout configuration of the plurality of possible layout configurations, based on the product data and the container layout data;

based on the product data, the container layout data, the determined historical total quantities, the determined historical shipping frequencies, and the determined maximum amounts, (i) selecting, with the processor, a layout configuration for the packing the plurality of products in the containers from the plurality of possible layout configurations, and (ii) determining, with the processor, a shipment frequency for shipping containers packed according to the selected layout configuration using an optimization model configured to minimize a cost of distributing the plurality of products in the supply chain;

outputting, with an output interface, the selected layout configuration and the determined shipping frequency; and operating an autonomous packing system to pack products of the plurality of products into at least one container according to the selected layout configuration.

2. The method of claim 1, wherein the optimization model includes a first constraint requiring that a demand for the plurality of products at each destination within the supply chain is satisfied by distributing the plurality of products according to the selected layout configuration and the determined shipping frequency.

3. The method of claim 2, wherein the optimization model includes a second constraint requiring that a total number of shipments to each destination in the supply chain per year is at least equal to a number of containers packed according to the selected layout configuration that collectively include a total number of products sufficient to meet a yearly demand of that destination.

4. The method of claim 1, the determining, for each product in the plurality of products, the maximum amount further comprising:
 determining a plurality of product orientations for packing the respective product into each layout configuration; and
 for each possible layout configuration in the plurality of possible layout configurations, selecting the product orientation enabling the maximum amount of the respective product to fit into the respective possible layout configuration.

5. The method of claim 1, wherein the historical demand data includes a plurality of periods of periodic demand data, the determining, for each destination in the plurality of destinations, the historical total quantity for each product in the plurality of products and the historical shipping frequency for each product in the plurality of products further comprising:
 filtering the plurality of periods of periodic demand data to only include data corresponding to products actively distributed by the supply chain, and destinations in the plurality of destinations that redistribute received products to other destinations in the plurality of destinations to produce filtered demand data;
 determining, for each destination in the plurality of destinations that redistributes received products, the historical total quantity of products for each product in the plurality of products demanded by the respective destination in the filtered demand data by adding together products distributed to the respective destination; and
 determining, for each destination in the plurality of destinations that redistributes received products, a historical shipping frequency for each product in the plurality of products to the respective destination by counting a number of product distributions to the respective destination over the plurality of periods.

6. The method of claim 5, wherein the plurality of periods of periodic demand data includes at least 8 weeks of weekly demand data.

7. The method of claim 5, wherein the plurality of periods of periodic demand data includes precisely 8 weeks of weekly demand data.

8. The method of claim 1, wherein the selecting the layout configuration and determining the shipping frequency in the optimization model is performed successively over time to account for changes in the historical demand data over time.

9. The method of claim 1, wherein the plurality of products are sub-grouped into trade units before being packed into the containers.

10. The method of claim 9, wherein the cost of distributing the plurality of products in the supply chain is defined by a sum of picking and packaging costs Cp, inventory management costs Ci, and shipping costs Cs.

11. The method of claim 10, wherein:
the historical demand data, the product data, the container layout data, and the determined maximum amounts define a plurality of parameters of the optimization model, including
 L—a the plurality of layouts configurations;
 l—a particular layout from the set L;
 P—a set of all products in the supply chain;
 p—a particular product in the set P;
 W—a set of destinations in the supply chain that redistribute received products to other destinations in the supply chain;
 w—a particular destination from the set W;
 $costLU_{l,p}$—a cost per container that includes inbound and outbound picking costs and assembly costs;
 tus—a quantity of products;
 $costTU_{l,p}$—a cost for packing each trade unit into a container; and
 $lus_{l,p}$—a quantity of products in an container for a given product p and layout configuration l;
a variable $y_w$ determined in the optimization model represents a number of containers shipped to destination w per year; and
the picking and packing costs Cp are defined by the equation:

$$Cp = \sum_{w \in W} \left( y_w \cdot costLU + \frac{y_w \cdot lus}{tus} \cdot costTU \right).$$

12. The method of claim 11, wherein:
the plurality of parameters further includes:
 $d_w$—a yearly demand of the destination w;
 $price_p$—a price of product p; and
 capitalcost—a multiplier for stock-keeping costs per year;
a variable newfreq represents the shipping frequency determined in the optimization model; and
the inventory costs Ci are defined by the equation:

$$Ci = \sum_{w \in W} \frac{newfreq_w}{52} * d_{p,w} \cdot price_p \cdot 0.5 \cdot capitalcost + \sum_{w \in W} lus_p \cdot price_p \cdot 0.5 \cdot capitalcost.$$

13. The method of claim 12, wherein:
the plurality of parameters further includes:
 $costvol_w$—a cost per unit volume shipped to destination w; and
 $LUvol_{l,p}$—a volume of a container packed with product p using layout configuration l; and
the shipping costs Cs are defined by the equation:

$$Cs = \sum_{w \in W} costvol_w \cdot y_w \cdot LUvol.$$

14. The method of claim 9, further comprising:
determining that a trade unit or group of trade units is too large to fit into a container; and
defining a further layout configuration as the trade unit or group of trade units not packed into the container.

15. The method of claim 9, further comprising:
determining that a trade unit or group of trade units is smaller than a smallest volume defined by the plurality of possible layout configurations by a predetermined factor; and limiting a quantity of trade units or groups of trade units that can be packed into a container to a quantity of trade units or groups of trade units fitting into the smallest volume.

16. The method of to claim 1, further comprising:
determining an amount of air space remaining in a container packed according to each possible layout configuration, the amount of airspace indicative of a packing efficiency of the layout configuration.

17. The method of claim 14, wherein the optimization model is further configured to optimize between minimizing the cost of distributing products and maximizing a packing efficiency.

18. The method according to claim 1, wherein the optimization model is further configured to group together different products in demand at a common destination into common containers.

19. A computing device for autonomously packing products into containers for distribution in a supply chain, the computing device comprising:
a memory configured to receive and store (i) historical demand data indicating previous demand of a plurality of products in the supply chain over a period of time, (ii) product data indicating costs and dimensions of the plurality of products, and (iii) container layout data indicating dimensions of containers used to pack the products and a plurality of possible layout configurations for packing the products in the containers, each possible layout configuration including at least one sub-division of the containers;
an output interface
a processor configured to:
determine, for each product in plurality of products, a maximum amount of the respective product to fit in each sub-division of each possible layout configuration of the plurality of possible layout configurations;
based on the historical demand data, the product data, the container layout data, and the determined maximum amounts, (i) select a layout configuration for the packing the plurality of products in the containers from the plurality of possible layout configurations, and (ii) determine a shipment frequency for shipping containers packed according to the selected layout configuration using an optimization model configured to minimize a cost of distributing the plurality of products in the supply chain;
operate the output interface to output the selected layout configuration and the determined shipping frequency; and
operating an autonomous packing system to pack products of the plurality of products into at least one container according to the selected layout configuration.

20. A method for autonomously packing products into containers for distribution in a supply chain, the method comprising:
receiving, and storing in a memory, (i) historical demand data indicating previous demand of a plurality of products in the supply chain over a period of time, (ii) product data indicating costs and dimensions of the plurality of products, and (iii) container layout data indicating dimensions of containers used to pack the products and a plurality of possible layout configurations for packing the products in the containers, each possible layout configuration including at least one sub-division of the containers;
determining, with a processor, for each product in the plurality of products, a maximum amount of the respective product to fit in each sub-division of each possible layout configuration of the plurality of possible layout configurations;
based on the historical demand data, the product data, the container layout data, and the determined maximum amounts, (i) selecting, with the processor, a layout configuration for the packing the plurality of products in the containers from the plurality of possible layout configurations, and (ii) determining, with the processor, a shipment frequency for shipping containers packed according to the selected layout configuration using an optimization model configured to minimize a cost of distributing the plurality of products in the supply chain; and
outputting, with an output interface, the selected layout configuration and the determined shipping frequency; and
operating an autonomous packing system to pack products of the plurality of products into at least one container according to the selected layout configuration.

* * * * *

UNITED STATES PATENT AND TRADEMARK OFFICE
CERTIFICATE OF CORRECTION

PATENT NO. : 10,614,395 B2
APPLICATION NO. : 15/135939
DATED : April 7, 2020
INVENTOR(S) : Naumann et al.

Page 1 of 1

It is certified that error appears in the above-identified patent and that said Letters Patent is hereby corrected as shown below:

In the Claims

In Claim 13, at Column 16, Line 56, in the lower limit of the summation, "w∈w" should read --w∈W--.

Signed and Sealed this
Twenty-first Day of July, 2020

Andrei Iancu
*Director of the United States Patent and Trademark Office*